S. W. REMER.
Stock-Car.

No. 159,357.

2 Sheets--Sheet 1.

Patented Feb. 2, 1875.

Witnesses.
L. H. Latimer
Wm Pratt

Inventor
Samuel W. Remer
per Crosby Gregory
Attys.

S. W. REMER.
Stock-Car.
No. 159,357.
2 Sheets--Sheet 2.
Patented Feb. 2, 1875.
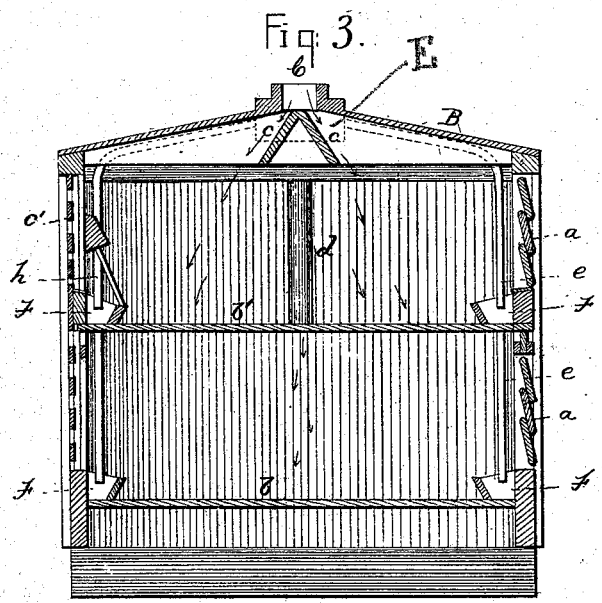
Witnesses.
L. H. Latimer
Wm Pratt
Inventor.
Samuel W. Remer
per Crosby Gregory.
Attys

UNITED STATES PATENT OFFICE.

SAMUEL W. REMER, OF SALEM, MASSACHUSETTS.

IMPROVEMENT IN STOCK-CARS.

Specification forming part of Letters Patent No. 159,357, dated February 2, 1875; application filed December 9, 1874.

*To all whom it may concern:*

Be it known that I, SAMUEL W. REMER, of Salem, in the county of Essex and State of Massachusetts, have invented an Improvement in Stock-Cars, of which the following is a specification:

My invention relates to stock-cars for railways, and has for its object the construction of a car that will enable the attendant to feed and water the stock from the top of the car; and my invention consists in a stock-car provided at top with openings, through which corn or other feed may be introduced, the said openings having, in connection therewith, inclined ways or tubes to conduct the corn or feed to the floor below, and the ways and tubes act to scatter it.

Figure 1:
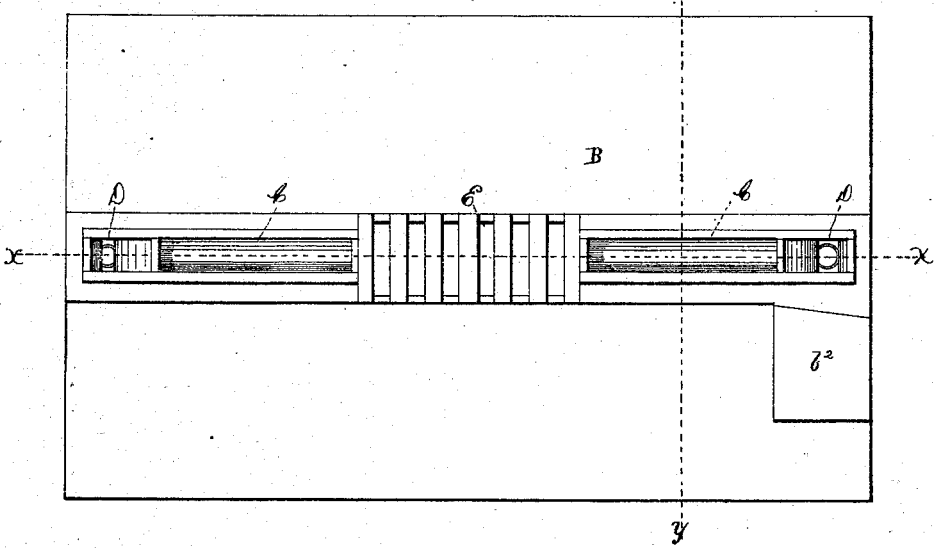
Figure 2:
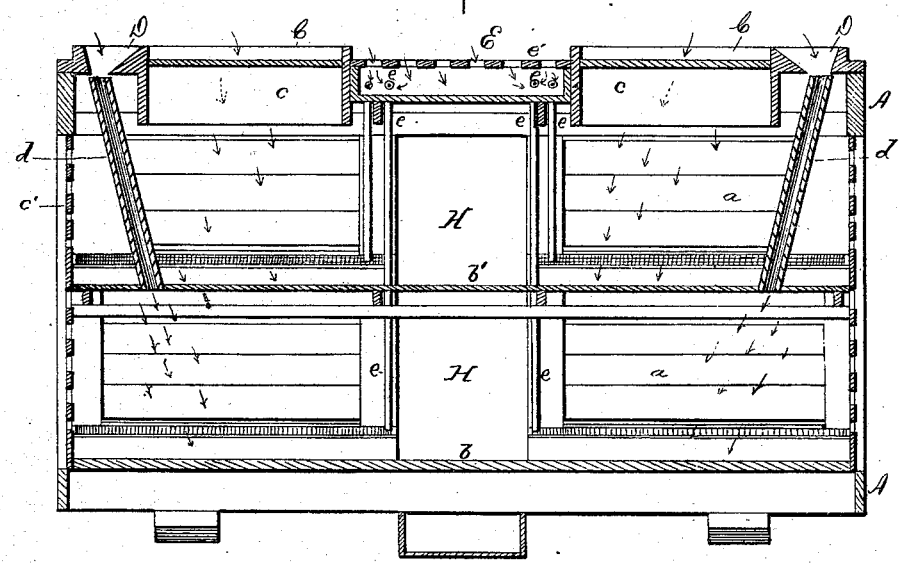

In the accompanying drawing, forming part of my specification, Figure 1 represents a top view of one of my stock-cars; Fig. 2, a longitudinal vertical section on line $x\ x$, Fig. 1; and Fig. 3, a cross-section on line $y\ y$, Fig. 1.

A represents the body of the car, of proper size and material, and firmly put together. B represents the roof. The sides and ends of the car are provided with slats, as at $a$ or $c'$. The slats $a$ are made to turn singly or together, so as to open or close the side of the car, and these turn-slats may be placed on the ends, as well as the sides, of the cars, instead of the stationary slats $c'$. The car has two floors, $b\ b^1$, and central doors, H H, leading therein, for the introduction and removal of stock, and at the sides of the car, on both floors, are placed troughs F, to receive water or other liquids. At the top of the car is a chamber, E, covered with slats, so that the attendant may walk over the top. Into this chamber water may be introduced by means of the usual conducting-pipe, and from reservoirs placed for supplying locomotives with water; and pipes $e\ e$ lead from said chamber E to the troughs F F, said pipes terminating, preferably, just above the tops of the troughs. By this means the stock may be readily and easily watered. At the top of the car, at each end, are openings C C, having immediately under them inclined ways $c\ c$, diverging toward the sides of the car, so that corn or other feed placed in the openings C C will fall through onto the inclined ways, and will fall, as denoted by arrows, and be scattered about on the floor $b^1$. Near these openings C are openings D, leading to pipes $d$, placed in an inclined position, their lower ends being nearer the center of the car than their tops; and these pipes serve to scatter the corn or other feed on the floor $b$, and at the same time these openings serve to ventilate the cars.

If desired, I may place at the side of the car grates or stanchions $h$, to confine the stock, or such portion thereof as may be desired, or to separate the stock when at the troughs.

A box, $b^2$, is formed in the top of the car, to contain corn or other feed; and the stock may be fed by the attendant when the car is in motion, and without being obliged to stop the car to get to a room within the car.

With my car the center is left unobstructed, giving more available space and better ventilation than would be the case with cars having a vertical central partition.

Covers may be applied to the openings C and D to exclude rain; and the car may be closed at the sides and ends by the turn-slats.

The stock may be placed in or removed from this car in any well-known way.

Having described my invention, I claim—

1. The combination, with the roof or side of a stock-car, provided with openings, of an inclined way or inclined ways, for scattering feed on the floor of the car, as set forth.

2. The combination, with the roof of the stock-car, provided with openings D, of the inclined pipes, for scattering feed on the lower floor, as set forth.

In testimony whereof I have signed my name to this specification in the presence of two subscribing witnesses.

SAML. W. REMER.

Witnesses:
G. W. GREGORY,
WM. PRATT.